Dec. 8, 1959 W. HIRSCH 2,916,733
COVER FOR ELECTRIC WIRING AND OUTLET
Filed July 26, 1957 2 Sheets-Sheet 2

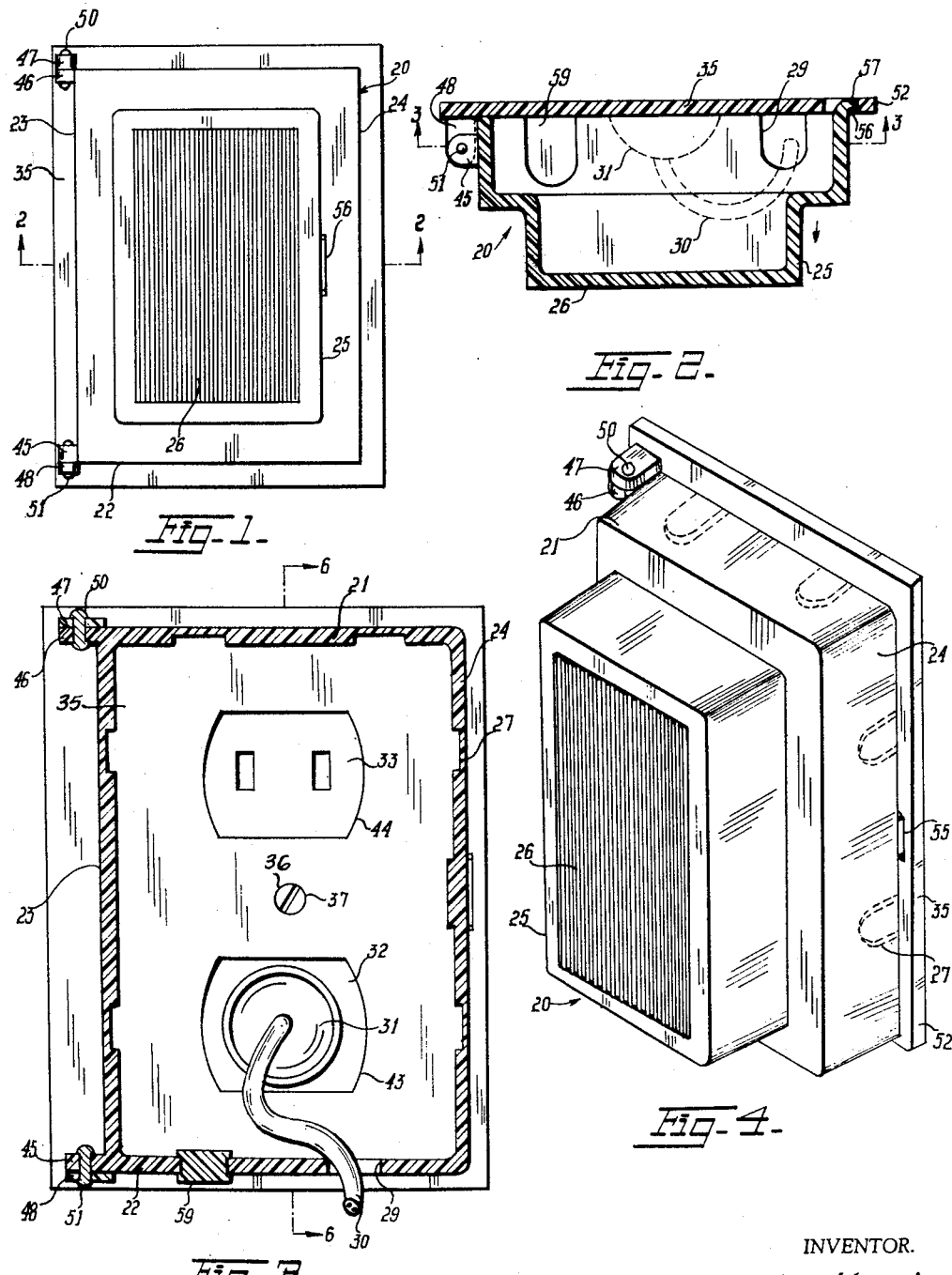

INVENTOR.
BY Wilbert Hirsch
ATTORNEY

United States Patent Office 2,916,733
Patented Dec. 8, 1959

2,916,733

COVER FOR ELECTRIC WIRING AND OUTLET

Wilbert Hirsch, Brooklyn, N.Y.

Application July 26, 1957, Serial No. 674,327

1 Claim. (Cl. 340—280)

This invention relates to a safety cover for a standard type of electrical receptacle as commonly employed in electrical wiring systems to provide plug-in utility outlets at various locations.

It is common practice to leave utility plug-in outlets of electrical wiring systems exposed so that plug-in connections may be quickly and conveniently made. Since such outlets are generally located in or near the baseboards on the interior walls of houses, they constitute a potential danger to young children who are attracted to the outlets and often probe into the outlet openings and the spaces between the plugs with their fingers or with pins, forks, etc.

Various types of protective shields or covers for these plug-in outlets have been devised heretofore. These prior devices have failed to conceal the outlets and plugs sufficiently to insure that visual attraction to young children and even to household pets is minimized.

It is a principal objects to provide a protective cover for an electrical receptable which wholly conceals the receptacle and any plug which may be inserted therein.

It is a further object to provide a protective cover for a household electrical receptacle, which cover is pivotally or slidably mounted on a base plate and provided with knockout means for passing electrical cords through the cover.

It is a further object to provide a protective cover of the character described with alarm or signal means which is automatically actuated when the cover is opened.

It is a further object to provide a decorative protective cover for a plug-in electrical outlet and including means for concealing any plugs and adjacent portions of the connected utility cords inserted in the outlet.

For further comprehension of the invention, and of the objects and advantages thereof, reference will be had to the following description and accompanying drawings, and to the appended claim in which the various novel features of the invention are more particularly set forth.

In the accompanying drawings forming a material part of this disclosure:

Fig. 1 is an elevational view of a safety cover embodying the invention.

Fig. 2 is a cross-sectional view of the cover taken on lines 2—2 of Fig. 1.

Fig. 3 is a longitudinal sectional view of the cover taken on lines 3—3 of Fig. 2.

Fig. 4 is a perspective view of the cover.

Figure 8:
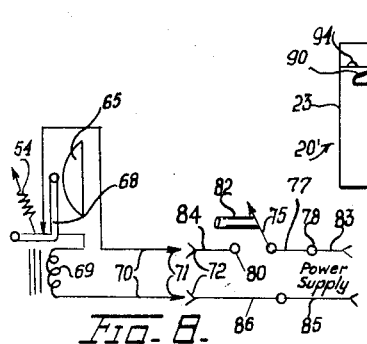
Fig. 8 is a diagram of the electrical circuit of the alarm device of Figs. 6 and 7.
Figure 12:
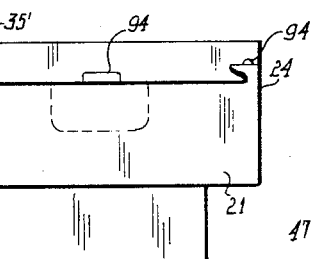
Fig. 12 is a top plan view of the safety cover shown in Fig. 9.

Referring to the drawing, there is shown in Figs. 1 through 5 a generally rectangular box 20 having a top wall 21, bottom wall 22, and side walls 23 and 24. The box is formed with a smaller forward section 25 having a front wall 26. In the top and sides are formed portions 27 having walls which are thinner than the remainder of the box. These portions serve as knockouts which may be removed for passage of utility cords therethrough. In the bottom wall 22 are formed two cut-outs 29 through which utility cords such as cord 30 may pass. The cord 30 is attached to a plug 31. The plug is inserted into a receptacle 32.

A rectangular base plate 35 is provided for pivotally supporting the box 20. The plate has a central aperture 36 through which a screw 37 may be inserted for securing the base plate to a support bar 40 as shown best in Fig. 6. The bar 40 connects the socket receptacles 32 and 33 which extend into apertures 43 and 44 in plate 35. These sockets are retained in a conventional wall outlet box (not shown). Perforated lugs 45 and 46 are formed on side 23. Perforated lugs 47 and 48 are formed on and extend from plate 35 and are engaged with lugs 45, 46. Pintles or rivets 50, 51 connect the lugs so that the box 20 can pivot on the plate. Near edge 52 of the plate 35 is a recess 55 having an undercut rim 56. A hooked prong or tongue 57 having a rounded end is formed on side 24 and projects from the free edge thereof. The prong is so formed that when the cover is being closed, the side or wall 24 flexes slightly at the center, and the prong snaps into the recess 55 and becomes engaged on rim 56.

Since a young child would normally be unable to exert the necessary squeezing force to bend side 24, the cover will be securely and safely closed when the box is snapped closed against plate 35. Box 20 and plate 35 are preferably made of plastic material which provides a substantially fireproof, electrically insulated enclosure for the receptacles 32, 33, plug 31 and connected portion of the cord 30.

Figure 5:
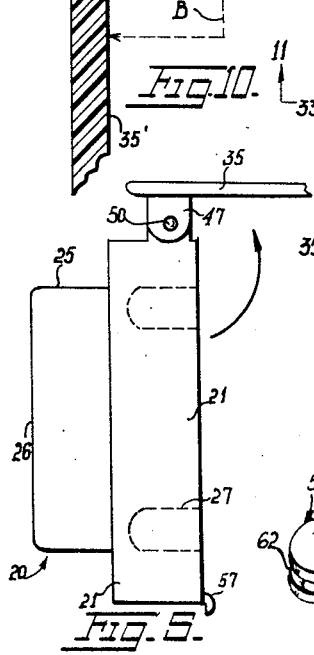
Fig. 5 is a top plan view of the cover in an open position.
Figure 5A:
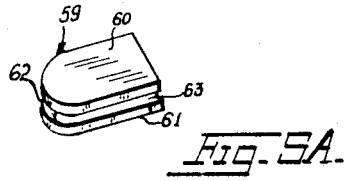
Fig. 5A is a perspective view of a knockout hole filler plug.
Figure 11:
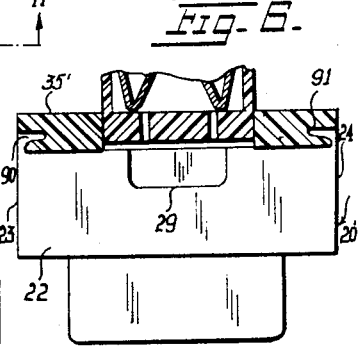
Fig. 11 is a cross-sectional view taken on lines 11—11 of Fig. 9.

In Fig. 5A is shown a suitable plug 59 which may be used to close either of the cut-outs 29 or any cut-out formed by knocking out a wall portion 27. This plug has opposite flat sides 60, 61 with a rounded end 62 and a groove 63 extending around the edge of the plug. This groove fits the rim of a cut-out snugly, and when the cover is closed this plug cannot be removed. Plug 59 is shown in Figs. 2 and 3 located in one unused cut-out in the bottom of the box.

Figure 7:
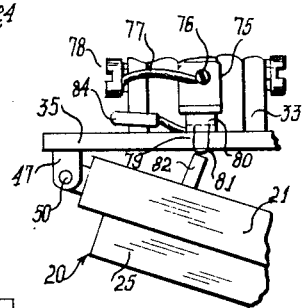
Fig. 7 is a top plan view of a portion of the safety cover and alarm device.
Figure 10:
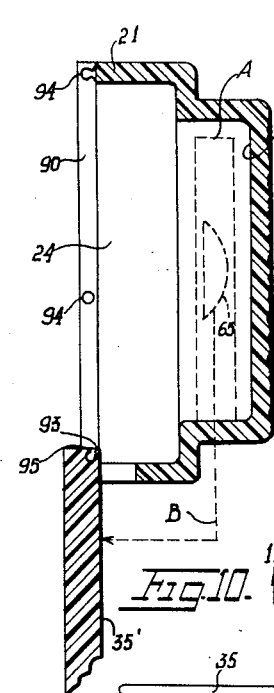
Fig. 10 is a longitudinal sectional view taken on lines 10—10 of Fig. 9, parts being broken away.
Figure 9:
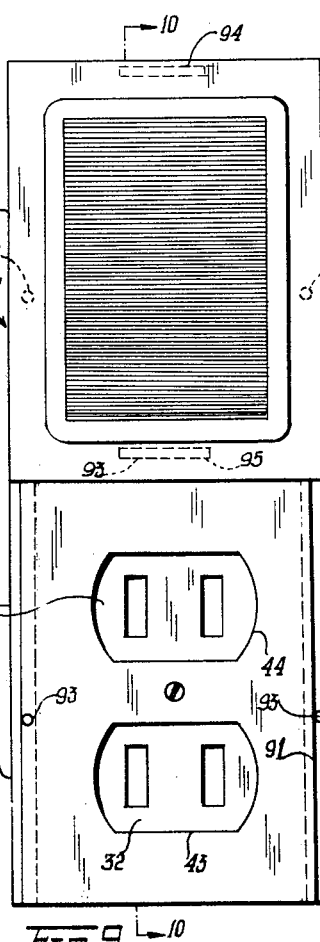
Fig. 9 is an elevational view of another form of safety cover according to the invention.
Figure 6:
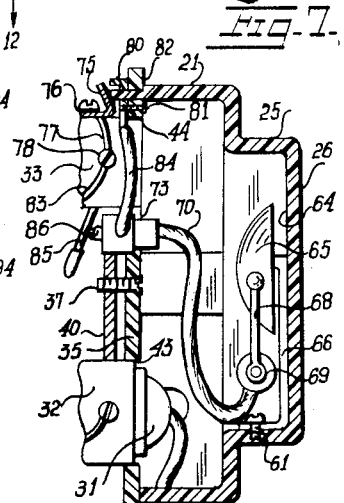
Fig. 6 is a longitudinal sectional view of the cover taken on lines 6—6 of Fig. 3 and showing an alarm device inserted in a compartment in the cover.

In Figs. 6 and 7 a signal or alarm device is shown located in compartment 64 provided in section 25. This alarm device includes a bell 65 supported on a bar 66 secured to the bottom wall of box section 25 by screws 61. A striker arm 68 biased by spring 54 is actuated by an electromagnet coil 69 energized via cord 70 attached to plug 71. The plug is removably inserted in an auxiliary socket 72 disposed in another aperture 73 in plate 35. On top of receptacle 33 is a spring contact 75 secured thereto by screw 76. The screw also holds the wire 77 which extends from a receptacle terminal 78. A fixed contact 80 is secured to plate 35 by a screw 81. This contact has an aperture 79 through which passes a pin extension 82 formed on top wall 21 of the box. This pin breaks electrical contact between the contacts 75 and 80 when the box is closed. When the box is opened an electrical current is supplied to coil 69 to actuate the striker 68.

In Fig. 8 is shown the electrical circuit of the alarm device. Coil 69 is connected to plug 71 at the end of cord 70, and is inserted in socket 72. Power supply wire 83 is electrically connected to spring contact 75 via wire 77 and terminal 78. Wire 84 is electrically connected to contact 80. Power supply wire 85 is electrically connected via wire 86 to one terminal of socket 72. Coil 69 actuates arm 68 biased by spring 54 away from bell 65. Pin 82 separates contacts 75 and 80.

In Figs. 9–12, box 20' is slidably mounted on plate 35'. The free edges of sides 23 and 24 of the box are formed with rabbets 90 which mesh with mating rabbets or grooves 91 formed in the plate 35'. The bottom 22 of the box has one or more cut-outs 29 for passing utility cords therethrough. Receptacles 32 and 33 terminate in apertures 43 and 44 in the same manner as for plate 35. A recess 93 is located near the top of plate 35' to receive the prong or pin 94 projecting from top 21 of the box. The prong fits in the recess with a snap fit and is dislodged by pushing the box upwardly. The top of the recess is set back at 95 to facilitate disengagement of the rounded end of the prong from the recess. Recesses 93 and prongs 94 are also provided on the sides of the plate and box. If desired, the alarm signal arrangement shown in Figs. 6 and 7 can be inserted in compartment 64 of box 20'. Such an alarm device is indicated by dotted lines A in Fig. 10 and includes a bell 65. The make and break connection effected by movement of the box with respect to plate 35' is indicated schematically by dotted line B.

To install any of the safety covers described, the usual rectangular cover plate will be removed and plate 35 or 35' will be attached to mounting bar 40 which is connected between receptacles 32 and 33. As noted above, these receptacles are permanently mounted in an electrical wall outlet box in conventional manner.

The construction of both boxes 20 and 20' and plates 35, 35' are such that they can be fabricated by mass production processes very economically. They are rugged in construction and provide adequate security for the purposes intended.

While I have illustrated and described the preferred embodiments of my invention, it is to be understood that I do not limit myself to the precise constructions herein disclosed and that various changes and modifications may be made within the scope of the invention as defined in the appended claim.

Having thus described my invention, what I claim as new, and desire to secure by United States Letters Patent is:

A protective cover for electrical wall outlets, comprising a generally rectangular box having an open rear portion and a forwardly disposed compartment, a rectangular plate having an opening, an electrical receptacle exposed at said opening, hinge means movably supporting the box on the plate for opening and closing said compartment, catch means releasably closing the box over said plate, an electrically operated bell secured to the box in said compartment, a plug supported in another opening in said plate, said plug being in electrical circuit with said bell, a spring contact carried by said receptacle, another contact carried by said plate and normally in closed circuit with said spring contact for ringing said bell, said plate having a further opening, said other contact being exposed at said further opening, and a pin extension on said box passing through said further opening and holding the contacts separated when the box is held closed by said catch means, whereby the bell is sounded when the box is opened.

References Cited in the file of this patent

UNITED STATES PATENTS

| | | |
|---|---|---|
| 787,372 | Giles | Apr. 18, 1905 |
| 1,029,281 | Davis | June 11, 1912 |
| 2,439,708 | Abraham | Apr. 13, 1948 |
| 2,462,756 | Leopold | Feb. 22, 1949 |
| 2,705,316 | Harris | Mar. 29, 1955 |
| 2,738,475 | Beach | Mar. 13, 1956 |